Nov. 13, 1945.  M. P. CHAPLIN  2,388,828
MACHINE FOR MANUFACTURING MOLDED PULP ARTICLES
Filed May 2, 1942  6 Sheets-Sheet 2
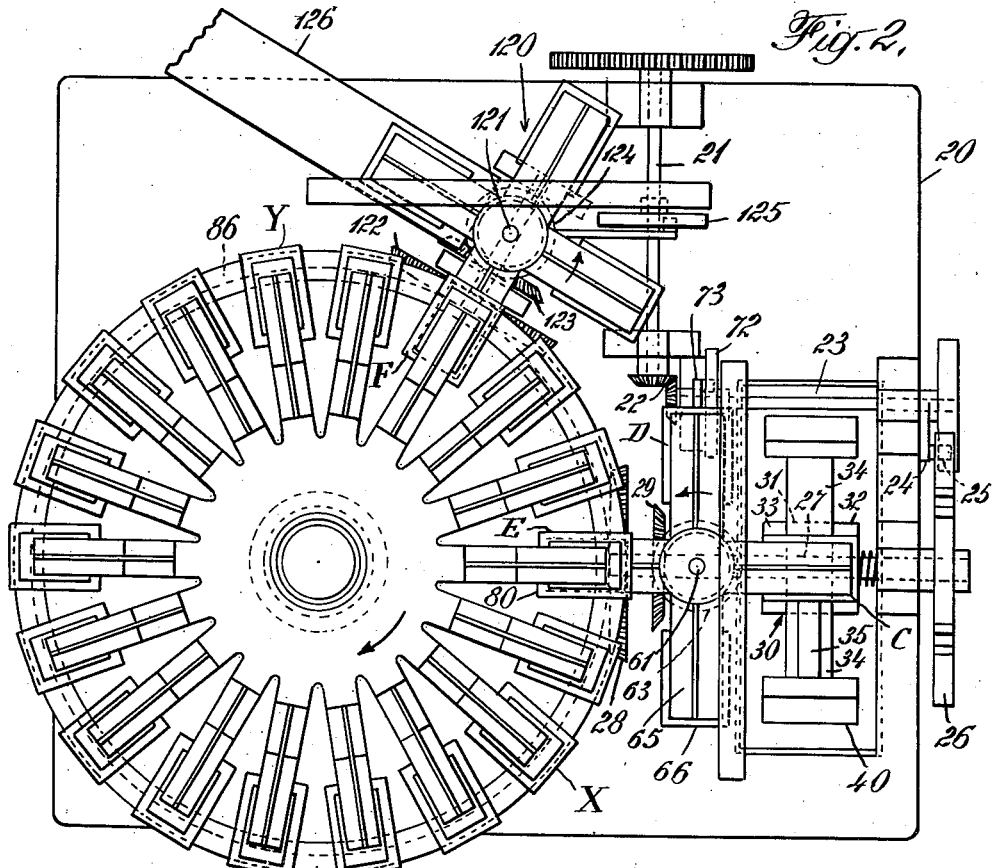
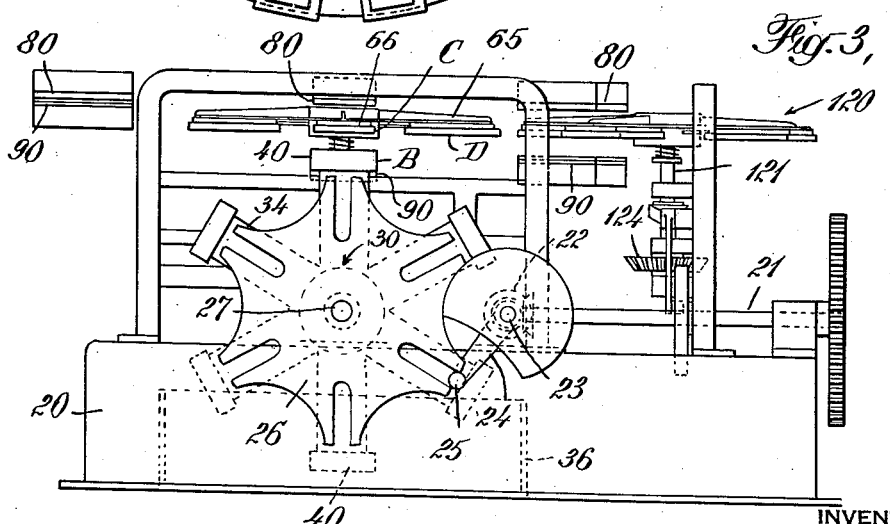
INVENTOR
Merle P. Chaplin
BY
E. W. Marshall
ATTORNEY

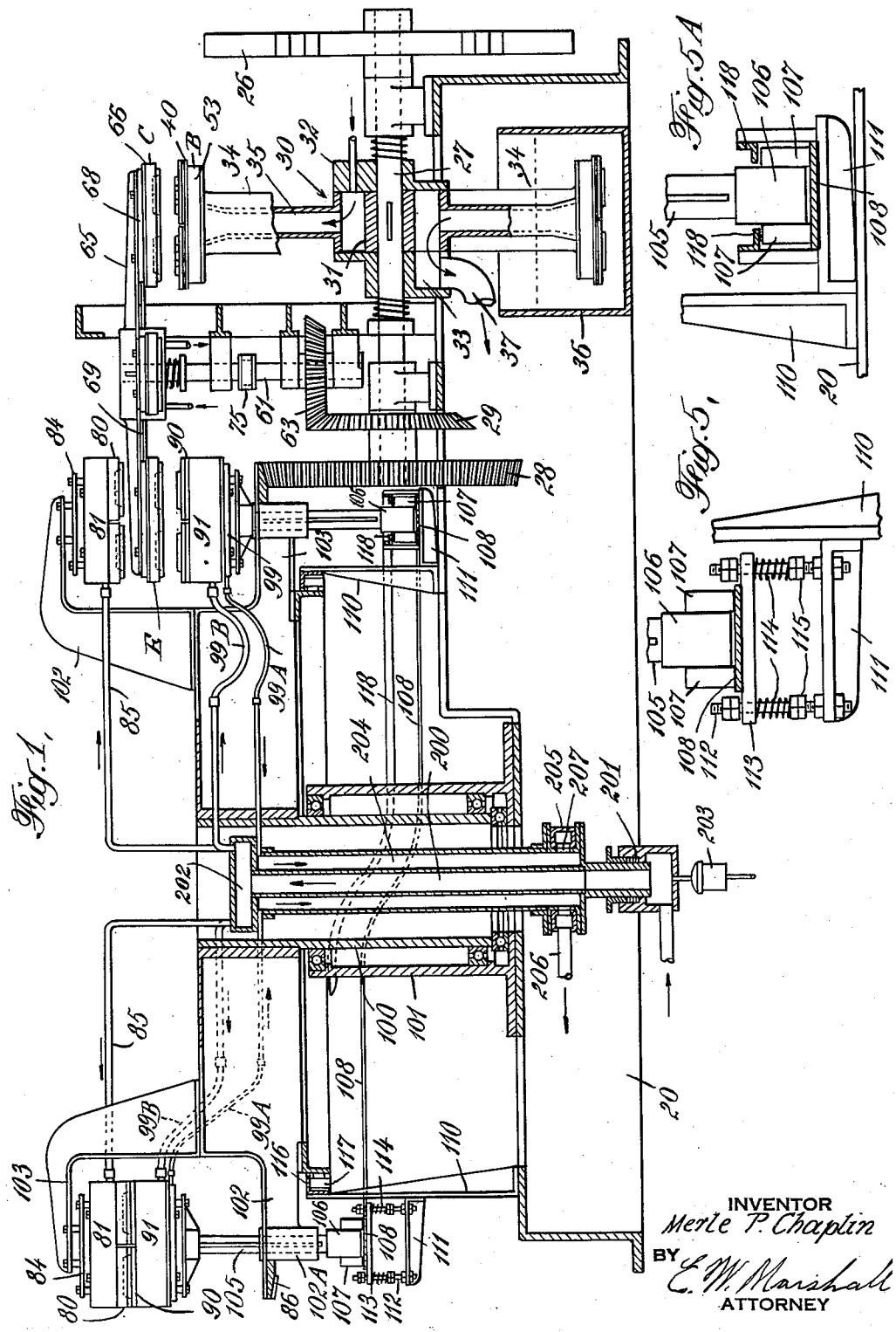

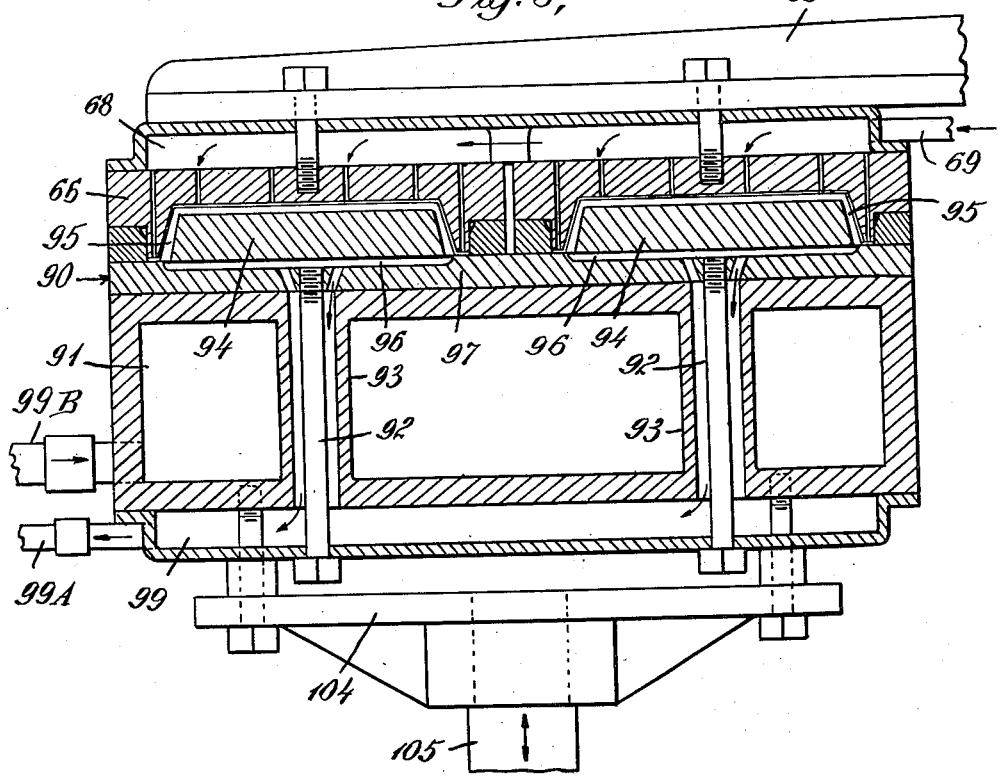
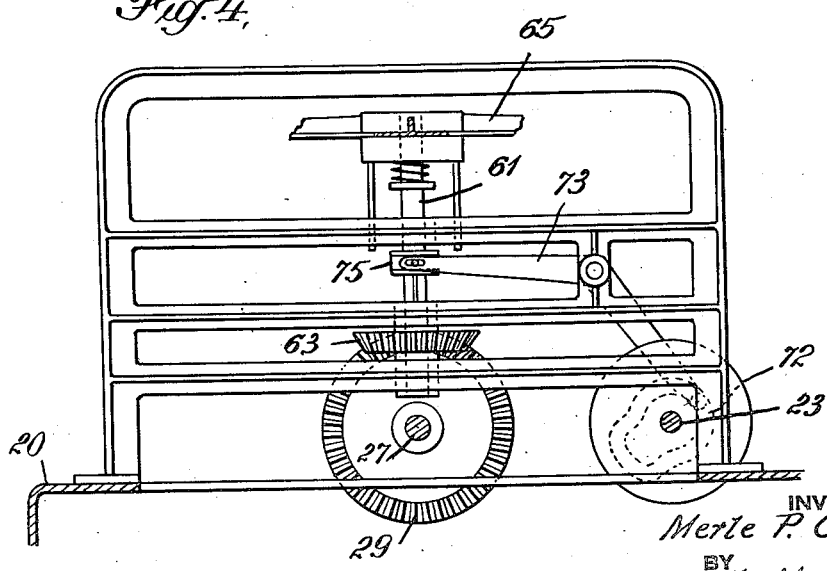

Nov. 13, 1945.  M. P. CHAPLIN  2,388,828
MACHINE FOR MANUFACTURING MOLDED PULP ARTICLES
Filed May 2, 1942  6 Sheets-Sheet 4
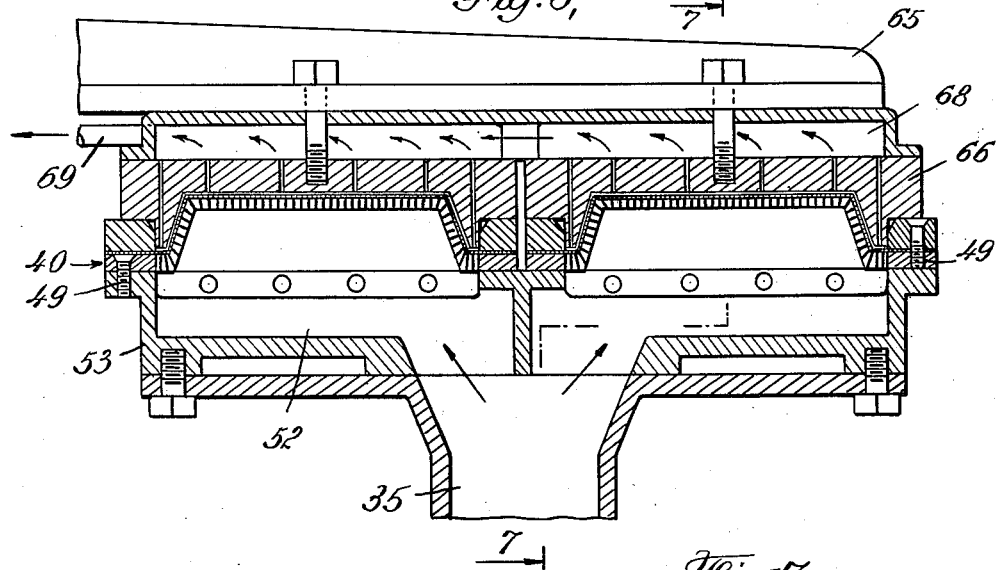
Fig. 6,
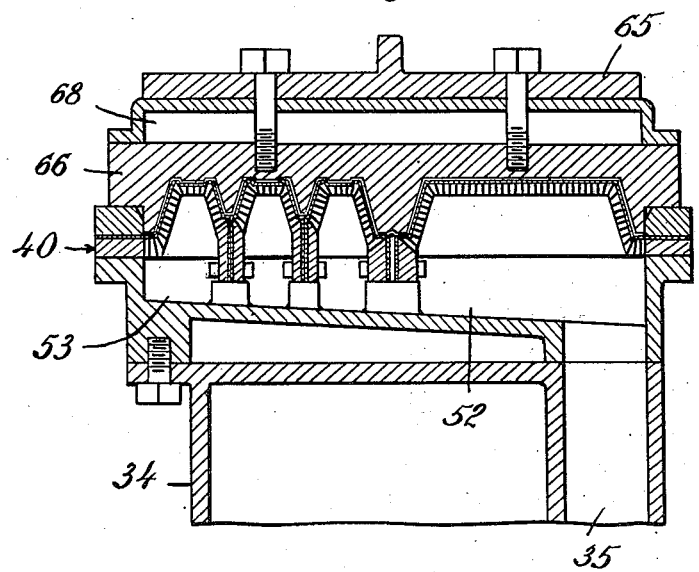
Fig. 7,
INVENTOR
Merle P. Chaplin
BY
E. W. Marshall
ATTORNEY

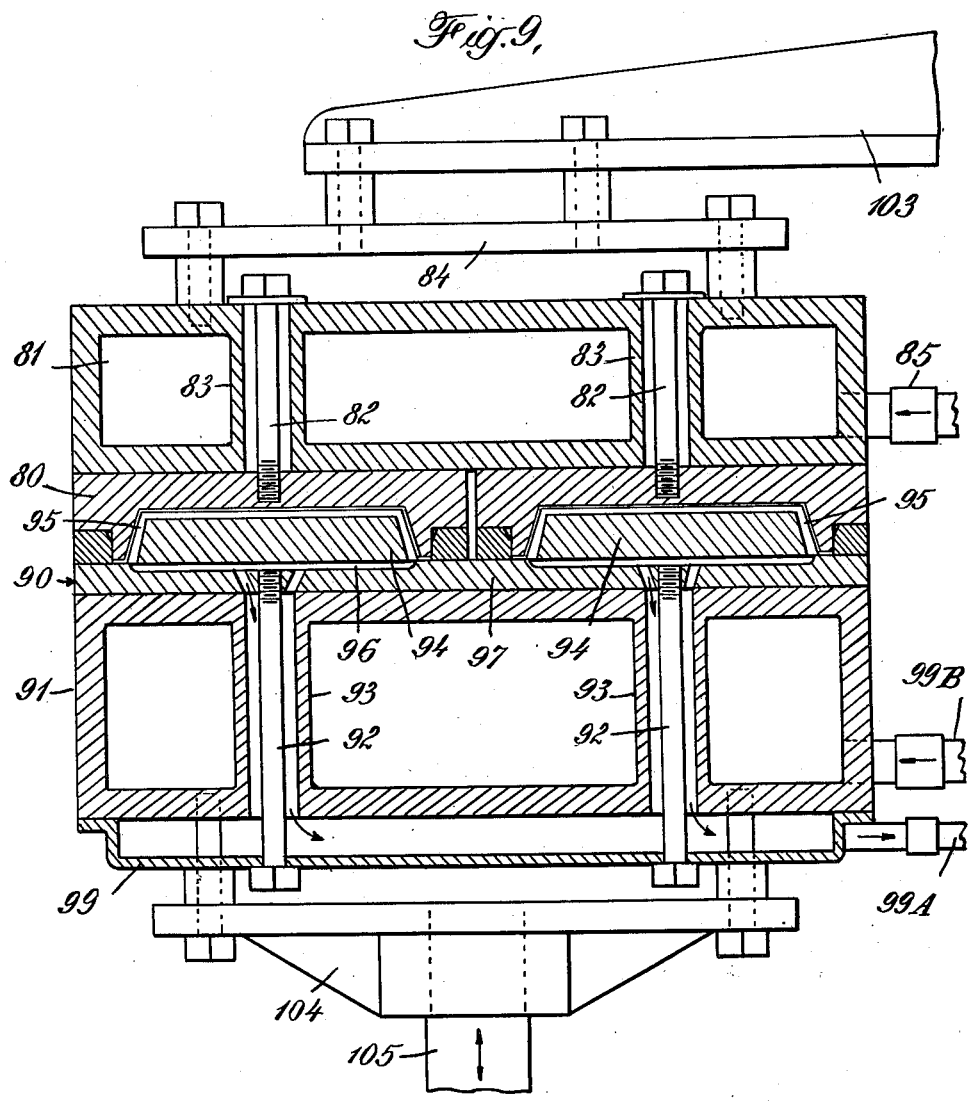
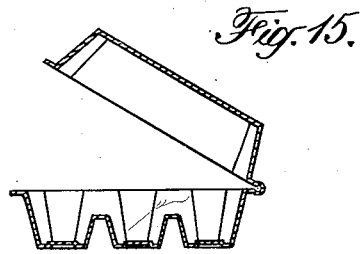

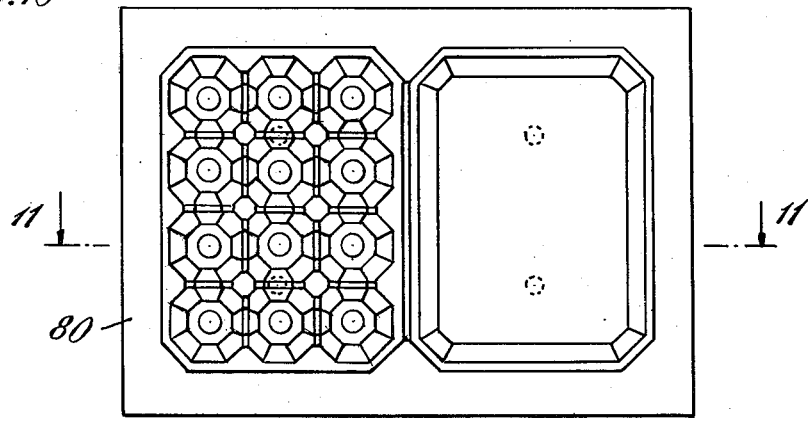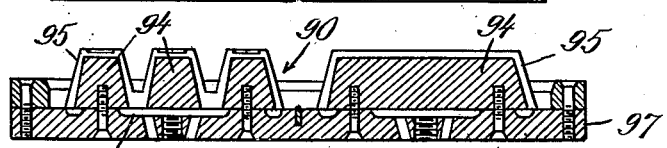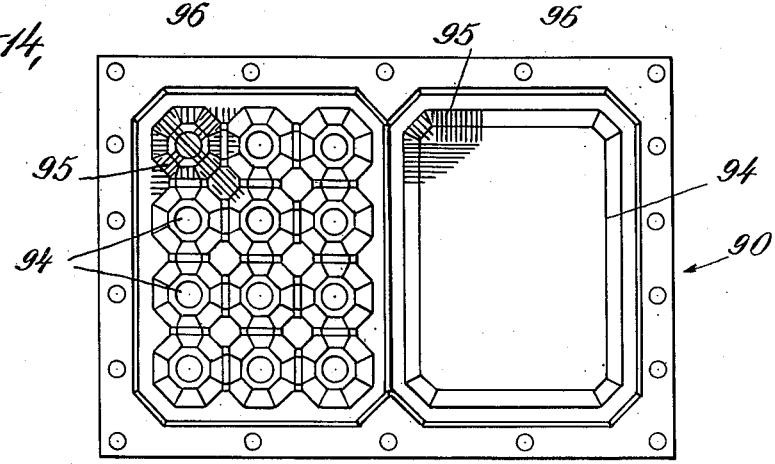

Patented Nov. 13, 1945

2,388,828

UNITED STATES PATENT OFFICE 2,388,828

MACHINE FOR MANUFACTURING MOLDED PULP ARTICLES

Merle P. Chaplin, Portland, Maine, assignor to Chaplin Corporation, Portland, Maine, a corporation of Maine Application May 2, 1942, Serial No. 441,432

3 Claims. (Cl. 92—56)

My invention relates to a machine for manufacturing molded pulp articles, and covers a unitary arrangement of mechanisms for forming, drying and finishing molded pulp products. Products of various sizes and shapes can be produced by the apparatus disclosed herein from a liquid pulp mixture which combines a unit for the suction forming or felting of an article on a contoured die from such a mixture, with an arrangement for delivering the wet felted article to drying mechanism, in which the article is finished to accurate size and shape and from which the finished article may be discharged automatically.

In the manufacture of certain molded fibre articles, it is desirable to have a specially designed unheated transfer die suitably shaped and arranged to remove the article from a forming die and subsequently to transfer the article to one of a pair of complementary drying dies which may be heated. In order that the forming die may remove as much of the water of formation from the article as possible, it is desirable to invert the die and the article so that the article rests on the upper surface of the die. This means that the article must be lifted upward upon its removal from the forming die and held on the bottom surface of the die which removes it from the forming die. When the article first contacts a hot drying die, considerable steam is generated, and where the article is lifted from the forming die directly by one of the drying dies, the steam generated at the instant of transfer tends to dislodge the article. Transferring the article to a cold transfer die presents no such problem and causes less difficulty. It is transferred downwardly to the hot die and its weight will keep it in place regardless of how much steam is generated, or whether or not suction is used on the hot die.

It is oft-times desirable and necessary to provide a position wherein the surface of the freshly formed or felted article may receive further treatment before drying. If the article is transferred directly from a forming die to a drying die, no such intermediate period or position is provided whereby these other operations can be successfully or practicably performed.

The mechanism which I here show interposes a transfer mechanism between the forming or felting dies and the drying dies, whereby the article surface adjacent to the wire mesh on the forming dies is placed on the surface of one of a pair of drying dies. Also, one or more intermediate positions are available between the point of transfer from the forming die to the point of transfer to the drying die, wherein any desired operation may be performed on the article.

A similar transfer mechanism may be employed for removing the article from a drying die at the completion of the drying cycle, this mechanism also providing means for printing or decorating the article, for delivering the article to a printing or coating means, or for stacking or packing the article for shipment.

All of the mechanism is arranged to move various dies from position to position through circular paths. When so moved through a true circular path and about central axes each die is successively brought into proper alinement with such other die of the same unit or other unit with which it cooperates for the various purposes hereinafter described. This provides a simple, rigid and durable mechanism, positively actuated and efficient in operation. Positive and accurate die alinement is easily maintained thereby enabling the maximum production of uniform articles of high quality.

These and other objects of the invention will appear in the following specification, in which I will describe the invention, the novel features of which will be described in appended claims.

Referring to the drawings,

Fig. 1 is a sectional side elevation of a machine which is made according to and embodies the present invention;

Fig. 2 is a plan view of the machine shown in Fig. 1 on a somewhat smaller scale;

Fig. 3 is an end elevation of the machine;

Fig. 4 is a sectional end elevation on a larger scale showing certain details of the machine;

Fig. 5 is an enlarged view of an adjustable cam track arrangement;

Fig. 5A is a similar view of another cam track;

Fig. 6 is an enlarged sectional side elevation of one of the forming dies and one of the transfer dies which are shown in Fig. 1, but in different relative positions;

Fig. 7 is a sectional elevation of the parts shown in Fig. 6, the section being taken on the line 7—7 of the latter figure;

Fig. 8 is a sectional side elevation of the transfer die shown in Fig. 6 positioned on one of the lower drying dies;

Fig. 9 is a similar elevation of a pair of the drying dies;

In Figs. 6–9 the molded articles are held between the respective dies.

Fig. 10 is a bottom plan view and Fig. 11 a sectional elevation of one of the upper drying dies.

The section in Fig. 11 is taken on the line 11—11 of Fig. 10;

Fig. 12 is a sectional elevation of one of the articles;

Fig. 13 is a sectional elevation and Fig. 14 is a top plan view of one of the lower drying dies; and Fig. 15 is a sectional end elevation of the article which is made by the particular form of dies illustrated herein.

The various units and other parts of the machine are mounted on a base 20. A constantly rotating drive shaft 21 driven at the proper speed by any suitable means actuates the various parts of the mechanism, effecting a step-by-step motion of the various rotating units with rest positions therebetween which during such rest position effects further operation or movement of the dies to transfer the article from die to die.

Drive shaft 21 is connected by gears 22 with a second drive shaft 23 on which is an arm 24 having a pin or roll 25 which engages radial slots in a disk or Geneva wheel 26 to impart a step-by-step rotation motion to a shaft 27 to which the disk or Geneva wheel 26 is fastened.

During the period of rotation of shaft 23 when pin 25 is disengaged from Geneva wheel 26 the wheel 26 is held in stationary position by any suitable means, such as a regular cam section Geneva lock as shown, or by any other suitable locking mechanism.

Mounted on shaft 27 is a forming unit indicated generally at 30, which comprises a hollow housing or hub 31 having a plurality of ports therein and located between a stationary pressure box 32 and a stationary suction box 33. Six arms 34 with parallel passages 35 extend radially from housing 31 and on the ends of these arms are mounted forming dies indicated generally at 40. Rotation of shaft 27 step-by-step through its Geneva wheel drive 26 causes forming dies 40 to be dipped successively in a liquid pulp mixture in a vat 36, to be removed successively from the mixture in the vat and to arrive in an inverted position in registration with a transfer die.

While the forming dies 40 are immersed in the liquid mixture in vat 36, suction is applied to the chamber in the rear of the forming dies, causing the liquid to be drawn from said mixture through the screen covering on the dies and perforations therein, leaving an even fiber deposit on said die surface. This suction forming operation is well known in the pulp molding art and requires no further description.

Any type, size, kind or number of dies can be mounted on the ends of the arms 34 of the forming unit. As here illustrated, there are six arms and six sets of forming dies. A greater or lesser number of arms could be used and the six here shown are simply illustrative. The forming dies 40, as shown particularly in Figs. 6 and 7, are shaped to form fiber egg cartons. This molded fiber article which consists of a container section with pockets therein for a dozen eggs and an integral hinged cover, is shown in Fig. 15.

The particular forming die or mold here shown is made up of a plurality of perforate sections, each section shaped to form a certain portion of the article and each provided with a pre-formed wire mesh covering. The several perforate sections, each with its wire mesh covering in place on the die surface, are bolted together to form an integral unitary die structure on which is deposited by suction from the liquid pulp mixture a wet layer of fiber.

These forming dies are mounted on holders 53 by means of screws 49. The die holders 53 are secured to a flange on the end of the arms 34 by means of suitable bolts or screws. Different types, sizes and kinds of dies can be mounted on the holder 53 or the entire holder with a different number or kind of dies thereon can be substituted and mounted on the arms 34.

A chamber 52 in the holder 53 provides a space beneath all perforate die sections into which the water of formation in the article is drawn by suction. The passage 35 of the arm 34 connects with the chamber 52 in holder 53 and with suitable openings in housing 31 connecting in turn to a portion in stationary suction box 33. Pipe 37 connects the stationary suction box 33 with any suitable source of vacuum, not shown, thereby drawing water of formation from the molds or dies through the passage aforementioned and out and away from the machine. It has already been explained that dies are immersed successively in the pulp vat 36, hence water is continually being drawn through the several dies and passages, the suction box 33 and pipe 37.

Continued step-by-step movement of shaft 27 brings the dies on the end of the various arms from the immersed position in the vat to position B in Figs. 1 and 3. In this position the forming dies, with a felted article thereon, are directly underneath and in alinement with cooperating transfer dies 66 indicated at position C in Figs. 1 and 3.

The transfer dies 66 and chamber 68 are supported by arms 65 mounted on a vertical shaft 61. The transfer dies 66 have two motions. First, a movement in a circular path about the axis of the shaft 61 and, second, a vertical movement secured by a periodic vertical reciprocation of shaft 61.

With shafts 27 and 61 at rotative rest, shaft 61 is moved downwardly by any suitable mechanism, such as a lever 73 (Fig. 4), engaging at one end a collar 75 on shaft 61 and given an oscillating movement by means of a roll on the other end, engaging a cam 72 on the shaft 23 which rotates constantly.

When the shaft 61 is moved downwardly a transfer die 66 is in exact alinement with a forming die 40. The downward motion of shaft 61 is so adjusted that the transfer dies 66 just contact the fiber deposit on the forming dies 40 without compressing this deposit between them. Just before such contact, vacuum or suction is cut off from the chamber in the rear of the die 40 and suction is applied through a pipe 69 to the chamber 68 in the rear of the perforate transfer die 66. Just as the shaft 61 starts its upward movement, compressed air is introduced through pressure box 32 and the passage arm 35 to the space in the rear of die 40 thereby ejecting the fiber deposit from die 40 to transfer die 66 on the surface of which it is retained by the suction previously applied to said surface.

When the shaft 61 has reached its final upward position, forming shaft 27 and transfer shaft 61 are each rotatively advanced one die position. The mechanism for rotating shaft 27 has already been described. Shaft 61 is connected by means of beveled gear 29 on shaft 27 and gear 63 on shaft 61. Therefore, at each period when shaft 27 is rotated, shaft 61 is similarly rotated in synchronism therewith, moving the transfer dies to their next step position at the same time that the forming dies are moved. This rotative movement of one die position of forming shaft 27 and transfer shaft 61 brings a second forming die 40 into registration with a second transfer die 66 and the operations previously described are repeated.

In this step position, the transfer dies have been moved from their alined position over the forming dies to an intermediate position between the forming dies and the drying dies to be described. This position is indicated generally at D in Figs. 2 and 3. In this position the article held on the transfer die can be given any coating treatment or mechanical treatment which may be desired prior to its being placed in position on one of a pair of drying dies.

Subsequent rotative movement of shafts 27 and 61 brings a transfer die with a treated article on it from position D to position E, Figs. 1 and 2. In this position the transfer die 66 is in alinement with one of a pair or set of pairs of drying dies 80 and 90.

In this position the article is transferred from the transfer dies 66 now in position E to a drying die 90 by the same downward movement of shaft 61 which effected the transfer of the article from the forming dies and which could effect a coating treatment or other mechanical treatment of the article on the transfer die at position D. In this transfer of the article from the transfer die to the lower drying die, no pressure is placed on the article between the transfer and lower drying die. Rather, the wet article is laid gently on the hot die and its surface in contact with the hot die immediately starts to dry without any explosive effect of steam quickly generated, as would be the case if pressure was placed on the article by the transfer die. After the return of shaft 61 to its uppermost position, forming dies and transfer dies are advanced one step position.

The drying dies consist of pairs of dies 80 and 90 arranged for circular movement about the axis of a hollow vertical shaft 100 mounted in a pedestal 101 on suitable radial and thrust bearings to permit easy and ready rotative movement. This shaft 100 carries with it a plurality of radial arms 102 on which are mounted brackets 103 for each pair of drying dies, hereinafter designated as upper drying dies 80. The arms 102 also provide guides for supporting other drying dies of each pair, hereinafter designated as lower drying dies 90.

Both sets of drying dies are mounted on suitable heater plates 81 and 91, respectively, in accordance with the teachings of Patent No. 2,206,276, issued to me July 2, 1940. The assembly of each pair or sets of pairs of drying dies 80 and 90, together with their heater plates and associated mountings is shown in Fig. 9. In this figure the upper drying dies 80 are constructed with depressions of predetermined shape and are secured to a heater plate 81 by means of bolts 82 which pass through hollow spacers or thimbles 83. The heater plate 81 is mounted on a bracket 84 which in turn is secured to one of the brackets 103. Steam and condensate return pipe 85 provides steam or other suitable heating medium for the heater plate 81.

The lower drying dies 90 are mounted on a similar heater plate 91 by means of bolts 92 which pass through thimbles 93 in heater plate 91. The lower heating die comprises a plurality of solid projections 94 (Fig. 14) which correspond to the depressions in the upper drying dies. Grooves 95 are formed in the surfaces of these projections which extend down to and communicate with grooves 96 in a plate 97 on which the projections are mounted. The grooves 96 communicate with a vapor chamber 98. The bolts 92 serve to hold the dies 90 in place and in close contact with the respective heater plate surfaces. It also holds the chamber 98 in place. A pipe 98A connected to chamber 98 permits steam or water of evaporation given off from articles between the drying dies to escape or to be drawn off by any suitable means. Pipe 98B supplies a suitable heating medium to heater plate 91.

Heater plate 91 is supported by a flange or head 104 which in turn is supported by a spindle 105 mounted for vertical reciprocation in a spindle bearing 102A in the arm 102. On the lower end of spindle 105 is a head 106 carrying rolls 107 which run over an arcuate cam track. Inclined parts of this cam track, acting upon rolls 107, raise the spindle 105 and the lower drying dies by virtue of the rotative movement of the entire unit carrying the several drying dies as the arms 102 rotate, and horizontal parts of the track maintain the lower heating dies in their raised position.

110 designates one of a plurality of pedestals which are affixed to the base 20. These pedestals are spaced around the outside of the path of movement of the arms 102. The upwardly inclined part of the cam track which raises the dies 90 begins at the position X (Fig. 5), and its horizontal portion extends to the position Y. At the latter position it is inclined downwardly. Brackets 111 project outwardly from the pedestals to support upstanding bolts 112. The cam track 108 is affixed to transverse plates 113, the ends of which are bored to fit loosely over these bolts and rest on compression springs 114, the compression of which can be adjusted by nuts 115. By this arrangement the amount of pressure which is placed upon the article between the upper and lower drying dies may be regulated and different amounts of pressure may be placed on the article during various stages of drying. The pedestals 110 also support a circular track 116 under which run rollers 117 on the arms 102 which take up the thrust of the lower drying dies 90 against the upper drying dies 80.

The entire drying units carrying both upper and lower drying dies is rotated by means of a beveled gear 86 on the drying unit, meshing with a beveled gear 28 on the forming shaft 27. It, therefore, follows that at each time the forming shaft 27 is advanced one die position by means of the Geneva gear already described, both transfer dies and drying dies are advanced one step position simultaneously, all dies coming to their predetermined rest position at the same time, permitting transfer of articles during their rest period from die to die.

The lower drying dies travel, together with the upper drying dies, in a true circular path about the axis of shaft 100. Above the downwardly inclined part of the cam track 108 which begins at the position Y (Fig. 2), are downwardly inclined stationary cam tracks 118 (Fig. 5A) above the roller 107 which depress the lower drying dies to their lower position between the positions Y and X (Fig. 2) when the dried articles are removed from them onto the take-off mechanism 120 at the position F (which will be described presently), and wet articles are transferred to them from the transfer dies 66 at the position E. On a subsequent rotative step of the drying unit, cam track 108 again lifts the lower drying die which has received a wet formed article from its lower position into its upper position, where the article is compressed between the lower drying die 90 on which it was originally placed, and its mating upper drying die 80.

The article is held compressed between these dies for a considerable number of step movements of the drying unit, and the rest intervals therebetween, during which time the water remaining in the article is evaporated and the surface of the article is finished, after which it is removed and the lower drying die moves downwardly carrying the finished article with it.

This downward movement of the lower drying die occurs just before the die reaches the take-off or discharge mechanism, designated generally by 120, Fig. 2. This take-off mechanism is similar to the transfer mechanism between the forming and drying dies already described and consists of a plurality of take-off dies mounted on arms rotating with a vertical shaft 121. This shaft is rotated step-by-step in synchronism with the drying unit being driven by beveled gear 122 intermeshing with gear 86 on the drying unit, this gear 122 being connected through a shaft and pair of beveled gears 123 and 124 with shaft 121. The lower drying dies and take off dies are brought into registration automatically, and while these dies are at rotative rest a downward movement of shaft 121 through operation of cam 125 on constantly rotating shaft 21, (functioning like cam 72 and lever 73) brings the take-off die down to the article on the lower drying die which is then detached from said lower drying die by a blast of air and lifted by suction onto the take-off die clear of the drying die. Subsequent step movement of shaft 121 brings the take-off die with the articles thereon over a conveyor belt 126 or to any stacking, packing or printing device to which the article is delivered by a blast of air.

To provide steam or other heating medium for the heater plates, a central steam pipe 200 is supplied with the medium from a chamber at its base through a rotating joint 201 and on the top of this pipe is a distributing chamber 202. A supply pipe is shown leading into the chamber at the base of the pipe 200. The pipes 85 and 99B are connected to this distributing chamber to furnish steam to the heater plates and remove the condensate therefrom. Condensate or condensed steam travels downwardly through pipe 200 and is removed by some suitable means, such as steam trap 203.

The pipe 99B which supplies the heating medium to the lower heater plate is flexible to provide for the upward and downward movement of the heater plate and the lower drying die. The pipe 99A is flexible for the same reason. The latter connects the vapor chamber 99 on the lower side of the lower heater plate with a plurality of pipes 204 which connect in turn with a rotating ported valve in surface contact with a stationary hub or valve member 205. The steam or water of evaporation from the articles compressed between the dies is removed through pipes 99A and 204 and can escape to atmosphere or be drawn off by vacuum during the drying period by pipe 206. At the completion of the drying cycle the vacuum or vapor escape port 207 cuts the vacuum off from one of each of the connecting pipes 204 and 99A and opens a compressed air port, forcing air through said pipes 204 and 99A to eject the article from the lower drying dies 90.

It will be seen, therefore, that I have provided a simple mechanism for the manufacture of finished dried molded fiber articles directly from liquid pulp mixtures. To simplify the drying unit mechanism, only a simple vertical movement is utilized for one of each pair or sets of pairs of drying dies, which separates these dies sufficiently to enable the transfer and take-off dies to pass between them to deposit wet articles in one position and to remove dry articles from them in another position. The mounting of the drying dies assures their accurate registration at all times, thereby insuring the production of uniformly finished articles.

The mechanism used to transfer the articles from the forming unit to the drying unit is equally simple. The transfer dies travel in a true circular path with periodic vertical movements in line with their die axes when these axes line up automatically in their rotative movement with the forming dies and the lower drying dies. The take-off mechanism is similar and equally simple.

All rotative unit structures are geared directly together so that all operate uniformly in synchronism and assure accurate die registration.

I have stated that molds of other shapes than those illustrated and described for forming egg containers may be used and I have successfully manufactured by the invention herein described plates, dishes, trays, cups, caps and other articles. It is obvious that other structural modifications may be made within the scope and spirit of this invention and I intend no limitations other than those imposed by the appended claims.

What I claim is:

1. In a pulp molding machine, a plurality of forming dies rotating in a vertical path, a plurality of pairs of permanently axially alined mating drying dies rotating in horizontal paths, a plurality of transfer dies rotating in a horizontal path between the path of the forming dies and the paths of the drying dies, the rotation of all of said dies being synchronous and intermittent with interspersed periods of rest, and means for imparting vertical reciprocation to the transfer dies while the forming dies and the drying dies are at rest and the drying dies are separated, to transfer articles from successive forming dies to a die of successive pairs of drying dies.

2. In a pulp molding machine, a forming unit comprising a horizontal shaft, a foraminous forming die mounted to rotate with said forming unit shaft in a vertical path, a drying unit comprising a vertical shaft and a pair of permanently axially alined mating drying dies mounted to rotate with said drying unit shaft in horizontal paths laterally spaced from the path of the forming die, means for imparting a relative vertical movement to said drying dies, a transfer unit interposed between the forming unit and the drying unit comprising a vertical shaft and a transfer die mounted to rotate with the transfer unit shaft in a horizontal path overlapping the path of the forming die and the paths of the drying dies, means for imparting intermittent rotation synchronously to the forming unit shaft, the drying unit shaft and the transfer unit shaft with interspersed periods of rest, to position the transfer die in axial alinement with the forming die and to position the transfer die between and in axial alinement with the drying dies, and means for imparting vertical reciprocation to the transfer die toward and away from the forming die and one of the drying dies while said forming die is at rest and the drying dies are separated and at rest.

3. In a pulp molding machine, a forming unit comprising a horizontal shaft, a plurality of angularly spaced foraminous forming dies mounted to rotate with said forming unit shaft in a vertical path, a drying unit comprising a vertical shaft, a plurality of angularly spaced pairs of permanently axially alined mating drying dies mounted to rotate with said drying unit shaft in horizontal paths laterally spaced from the path of the forming dies, means for imparting a relative vertical movement to the drying dies of each pair successively, a transfer unit interposed between the forming unit and the drying unit comprising a vertical shaft and a plurality of angularly spaced transfer dies mounted to rotate with the transfer unit shaft in a horizontal path overlapping the path of the forming dies and the paths of the drying dies, a drive shaft, means for intermittently imparting rotation of the drive shaft synchronously to the forming unit shaft, the drying unit shaft and the transfer unit shaft with interspersed periods of rest to position successive transfer dies in axial alinement with successive forming dies and with successive pairs of drying dies, and means actuated by the drive shaft while the forming dies and drying dies are at rest for imparting vertical reciprocation to the transfer dies to simultaneously move one of the transfer dies toward and away from the forming die with which it is alined and another transfer die toward and away from one of the pair of drying dies with which it is alined.

MERLE P. CHAPLIN.